Jan. 31, 1956  F. F. DE WIJN  2,733,084
PIPE-CONNECTION CLIPS

Filed Jan. 28, 1953  2 Sheets-Sheet 1

United States Patent Office 2,733,084
Patented Jan. 31, 1956

2,733,084

PIPE-CONNECTION CLIPS

Franciska Francina de Wijn, Bennebroek, Netherlands

Application January 28, 1953, Serial No. 333,780

6 Claims. (Cl. 287—54)

This invention relates to new and useful improvements in pipe-connection clips, especially for connecting pipes in scaffolding.

An important object of my invention is to provide a pipe-connection clip which is light, cheap and extraordinary strong and can be easily manufactured out of strips of metal sheet, which are welded together.

Another object of the invention is to provide a pipe connection clip for connecting two pipes crossing each other at right angles which has a great resistance against deformation, especially against deformation caused by torsional stress, which often occurs when the clips are used for connecting pipes in scaffolding.

These and other objects and advantages of the invention will become apparent from a consideration of the following detailed description taken in connection with the accompanying drawings, wherein a satisfactory embodiment of the invention is shown.

Figure 3:
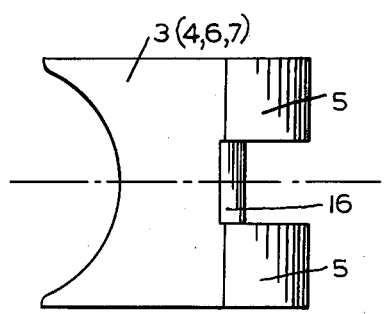
Figure 4:
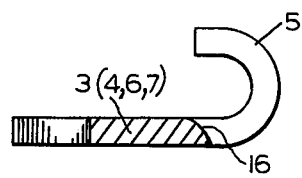

Figures 3 and 4 respectively show a plan-view and a side-view of a supporting plate.

Figure 5:
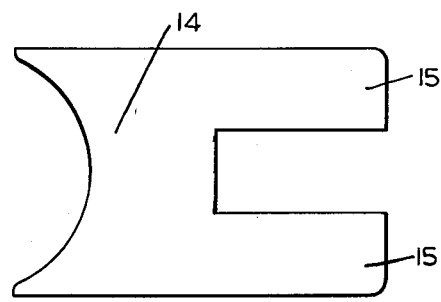

Figure 5 shows a development of a supporting plate.

Figure 1:
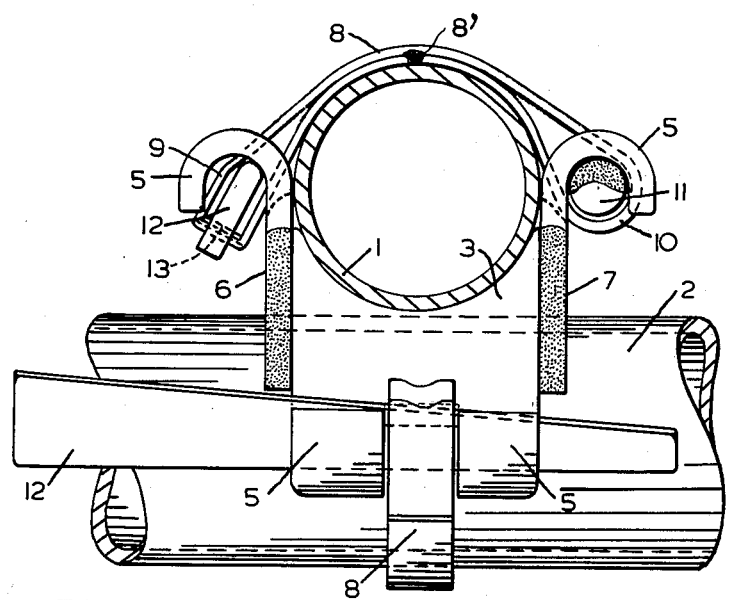
Figure 1 is a side-view of a connection clip according to the invention for connecting two pipes crossing each other at right angles, shown with the pipes inserted therein.
Figure 2:
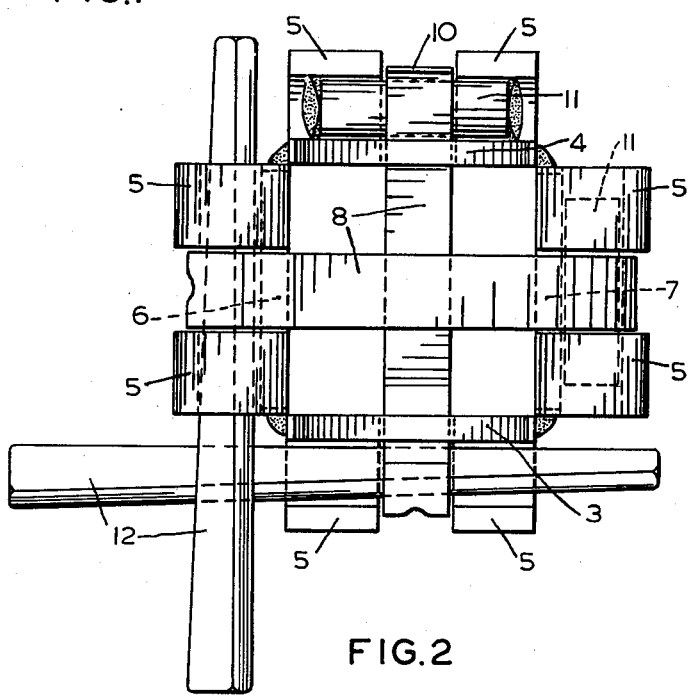
Figure 2 shows a plan-view of the connection clip of Figure 1 without pipes.

In the Figure 1 the pipes crossing each other at right angles are indicated by 1 and 2 respectively.

The pipe 1 is supported by a pipe rest formed by two parallel semi-cylindrically cut out supporting plates 3 and 4, each of said plates at the side opposite the semi-cylindrical recess being provided with two spaced hooks 5. The pipe-rest for the other pipe 2 is identically formed by similar supporting plates 6 and 7 which are welded to the supporting plates 3 and 4, forming a strong body for the connecting clip of rectangular tubular section together.

In order to clamp the pipe 1 in its rest (3, 4), a semi-cylindrical clamping strap 8 is provided, consisting of a strip of metal sheet, both ends of said strip being folded to the inside for shaping a wedge-eye 9 and an eye 10 for the swing bolt 11 respectively, the free ends of said strip being butt-welded to each other and to the outer strip as indicated by 8.

A swing bolt 11 welded into the corresponding hooks 5 is inserted through the eye 10, whilst through the wedge-eye 9 a wedge 12 is driven, which at its topside is supported against the corresponding hooks 5. The points of contact between the wedge 12 and its hooks 5 and the line of contact between the swing bolt 11 and its hooks at the other side, are lying in a plane which passes through the centre-line of the pipe 1 or passes at a short distance therefrom.

The bottom of each wedge-eye 9 is shaped in such a manner that the wedge 12 supported thereon is slantingly directed to the inner side of the supporting hooks 5, thus preventing that these hooks are loaded by a large bonding moment.

Moreover the bottom of the wedge-eye 9 in the longitudinal central plane of the clamping strap 8 is forced somewhat to the inside, thus forming a wearing rib 13 (Fig. 1) on which the wedge is supported when it is pushed in or out, so that the remaining section part of the bottom is maintained at the required strength.

In the Figures 3 and 4 the principal element or supporting plate 3 (4, 6, 7) of the pipe-connection clip is separately shown. It can be manufactured from the flat metal plate according to Figure 5 which can be punched out of a strip of metal sheet. The shoulders 15 are bent into the hooks 5 and the edge between the shoulders is rounded off at 16.

Although I have shown and described herein some preferred embodiments of my invention, it is to be definitely understood that I do not desire to limit the application of the invention thereto, and any change may be made in the materials, and in the structure and arrangement of the parts, within the spirit of the invention and the scope of the subjoined claims.

What is claimed is:

1. A pipe connection clip for interconnecting two pipes crossing each other at right angles which comprises two pairs of sheet metal plates interconnected by welding at their side edges to define a unit of rectangular cross-section, the plates of each pair being oppositely disposed in said unit and being formed along one end edge with a semi-cylindrical cut-out for receiving one of the pipes and being formed at the opposite end edge with two integral retroverted spaced-apart fingers defining a recess therebetween, a hinge bolt welded to the fingers of one plate of each pair and extending across the recess between said fingers, a flexible clamping strap in the form of a loop flattened at its center having an eye at one end extending around each hinge bolt and said strap having a second end extending into the recess between the retroverted fingers of the plate opposite the hinge bolt, said strap defining a wedge eye at said last-named end, and a wedge inserted through said wedge eye to apply tension to said strap, said wedge bearing against the end of said wedge eye and against the adjacent retroverted fingers.

2. A pipe connection clip for interconnecting two pipes crossing each other at right angles which comprises two substantially identical pairs of sheet metal plates interconnected by welding at their side edges to define a unit of rectangular cross-section, the plates of each pair being oppositely disposed in said unit and being formed along one end edge with a semi-cylindrical cut-out for receiving one of the pipes and being formed at the opposite end edge with two integral retroverted spaced-apart fingers defining a recess therebetween, a hinge bolt welded to the fingers of one plate of each pair and extending across the recess between said fingers, a flexible clamping strap in the form of a loop flattened at its center having an eye at one end extending around each hinge bolt and said strap having a second end extending into the recess between the retroverted fingers of the plate opposite the hinge bolt, said strap defining a wedge eye at said last-named end, and a wedge inserted through said wedge eye to apply tension to said strap, said wedge bearing against the end of said wedge eye and against the adjacent retroverted fingers.

3. A pipe-connection clip as claimed in claim 1, wherein the plane through the points of contact between said wedge and its supporting fingers and through the line of contact between said hinge bolt and its supporting fingers passes through or substantially through the center line of the clamped pipe.

4. A pipe-connection clip as claimed in claim 1, wherein said clamping strap is formed from a strip of metal sheet, the ends of said strap being inwardly folded in order to form the eye for the hinge bolt and the wedge-eye respectively and being butt-welded to each other and to the outer loop portion of the clamping strap.

5. A pipe-connection clip as claimed in claim 1, wherein the wedge-eyes of the clamping straps are shaped to define a wedge receiving channel which slopes inwardly toward the associated plate of the clip whereby the wedge-eyes direct the wedges inserted therein slantingly to the inner sides of the corresponding supporting fingers.

6. A pipe-connection clip as claimed in claim 1, wherein the bottoms of the wedge-eyes are formed with an inwardly directed rib for engagement with the wedge providing a wearing surface therefor.

References Cited in the file of this patent

UNITED STATES PATENTS

| | | |
|---|---|---|
| 2,017,626 | Kohnke | Oct. 15, 1935 |
| 2,234,222 | Baerer | Mar. 11, 1941 |
| 2,477,696 | Kohnke | Aug. 2, 1949 |
| 2,542,424 | Mulder | Feb. 20, 1951 |

FOREIGN PATENTS

| | | |
|---|---|---|
| 103,641 | Australia | of 1938 |
| 947,562 | France | of 1949 |
| 1,012,892 | France | of 1952 |